(12) United States Patent
Landry

(10) Patent No.: US 8,282,069 B2
(45) Date of Patent: Oct. 9, 2012

(54) CINCH VALVE

(75) Inventor: Marc S. Landry, Vernon, NJ (US)

(73) Assignee: Acrison, Inc., Moonachie, NJ (US)

( * ) Notice: Subject to any disclaimer, the term of this patent is extended or adjusted under 35 U.S.C. 154(b) by 532 days.

(21) Appl. No.: 12/277,629

(22) Filed: Nov. 25, 2008

(65) Prior Publication Data
US 2010/0127194 A1 May 27, 2010

(51) Int. Cl.
*F16K 7/04* (2006.01)
(52) U.S. Cl. ............... 251/4; 251/212; 251/294
(58) Field of Classification Search ............... 251/4, 5, 251/7, 9, 212, 294; 53/138.3, 138.7
See application file for complete search history.

(56) References Cited

U.S. PATENT DOCUMENTS

| | | | |
|---|---|---|---|
| 1,809,091 A | 6/1931 | Wiken | |
| 2,434,835 A * | 1/1948 | Colley | 138/45 |
| 2,569,850 A * | 10/1951 | Falconer | 493/308 |
| 2,846,179 A | 8/1958 | Monckton | |
| 3,473,779 A | 10/1969 | Gustafson et al. | |
| 4,092,010 A * | 5/1978 | Carlson, Jr. | 251/4 |
| 4,322,054 A | 3/1982 | Campbell | |
| 4,401,107 A * | 8/1983 | Haber et al. | 600/30 |
| 4,412,669 A * | 11/1983 | Hanyu et al. | 251/4 |
| 4,518,106 A | 5/1985 | LaFleur | |
| 4,551,862 A * | 11/1985 | Haber | 600/30 |
| 4,553,271 A * | 11/1985 | Baker | 623/23.66 |
| 4,569,502 A | 2/1986 | Elliott | |
| 4,705,518 A * | 11/1987 | Baker et al. | 623/14.13 |
| 5,155,976 A | 10/1992 | Okabe et al. | |
| 5,340,218 A | 8/1994 | Cuthbertson | |
| 5,495,707 A | 3/1996 | Lauzon | |
| 5,787,689 A | 8/1998 | Dearing | |
| 5,788,449 A * | 8/1998 | Riemersma | 414/415 |
| 5,918,447 A | 7/1999 | Hanten et al. | |
| 6,705,063 B1 | 3/2004 | Topfer et al. | |
| 6,834,995 B1 | 12/2004 | Stevens | |
| 6,860,463 B2 * | 3/2005 | Hartley | 251/4 |
| 6,892,510 B2 | 5/2005 | Sterner et al. | |
| 6,993,891 B2 * | 2/2006 | Richardson et al. | 53/567 |
| 7,032,875 B2 | 4/2006 | Sterner et al. | |

FOREIGN PATENT DOCUMENTS

| | | |
|---|---|---|
| DE | 1882434 | 11/1963 |
| DE | 10057104 C1 | 12/2001 |
| GB | 2250016 A | 5/2002 |
| WO | WO0181177 | 11/2001 |
| WO | WO03080446 | 10/2003 |

* cited by examiner

*Primary Examiner* — John K Fristoe, Jr.
*Assistant Examiner* — Marina Tietjen
(74) *Attorney, Agent, or Firm* — Fish & Richardson P.C.

(57) ABSTRACT

A cinch valve includes an upper plate having a first aperture; an orbital plate rotatable relative to the upper plate and having a second aperture substantially aligned with the first aperture; an actuator coupled to the orbital plate arranged to rotate the orbital plate between a first position and a second position; and a plurality of cables each having a flexible portion and each having a first end and a second end, wherein each first end is coupled to the upper plate and each second end is coupled to the orbital plate. Rotation of the orbital plate from the first position to the second position causes the plurality of cables to converge and form a woven closure in approximately the center of the second aperture.

18 Claims, 9 Drawing Sheets

US 8,282,069 B2

CINCH VALVE

TECHNICAL FIELD

This disclosure relates to a cinch valve.

BACKGROUND

In the dry solids industry, so-called "bulk bags" have become one of the more popular methods of transporting and storing bulk materials. This change could be due to the reduced cost associated with the usage of bulk bags versus other methods. They are cost effective and easily handled, transported and stored. Typically, bulk bags are constructed of a strong synthetic (e.g., cloth) material and include lifting loops and a discharge spout. For unloading bulk bags, there exist various types of bulk bag unloaders that employ particular mechanisms to effectively unload the material stored within bulk bags.

There are functional challenges associated with the handling and discharging of material from bulk bags. Vibration and mechanical agitation (e.g., slow moving paddles) are most commonly utilized to assist unloading material from bulk bags, especially those materials that are non-free-flowing, or those that have become packed within the bags during transit and/or storage. An additional change from traditional material handling methods is that many end users of the bulk bags use the bulk bags themselves as storage hoppers to deliver materials to a process, which eliminates the need for an intermediate hopper. Although bulk bags offer some significant advantages, difficulties arise when a process requires a material change before the bulk bag is empty.

SUMMARY

In some implementations, a cinch valve includes an upper plate comprising a first aperture; an orbital plate rotatable relative to the upper plate and comprising a second aperture substantially aligned with the first aperture; an actuator coupled to the orbital plate arranged to rotate the orbital plate between a first position and a second position; and a plurality of cables each comprising a flexible portion, each having a first end and a second end, wherein each first end is coupled to the upper plate and each second end is coupled to the orbital plate. Rotation of the orbital plate from the first position to the second position causes the plurality of cables to converge and form a woven closure in approximately the center of the second aperture.

The details of one or more implementations are set forth in the accompanying drawings and the description below. Other features and advantages will be apparent from the description and drawings, and from the claims.

DETAILED DESCRIPTION

The following is a description of some preferred implementations, as well as some alternative implementations, of a cinch valve.

I. Overview

A cinch valve can close-off the discharge spout of a partially emptied bulk bag, typically when process stipulations require a material change before the bulk bag is empty to avoid the need for a processor to discharge the entire contents of the bag before a material change can be implemented, which can be costly and time consuming. A cinch valve allows for the closure of a partially emptied bulk bag when such a product change is required.

In some implementations, this is accomplished with a series of four cables mounted about 90 degrees apart. For example, one end of each cable is attached to an upper fixed mounting plate; the other is attached to a rotating orbital plate. In some implementations, the cables comprise portions that are flexible. For example, substantially the entire cable can be flexible. The orbital plate is captured within the cinch valve by grooved bearing (bushing) idlers that constrain the orbital plate in position, while still allowing the orbital plate to rotate. This orbital plate is attached to a linear actuator (e.g., pneumatic air cylinder) via a clevis and pin arrangement.

Figure 3:
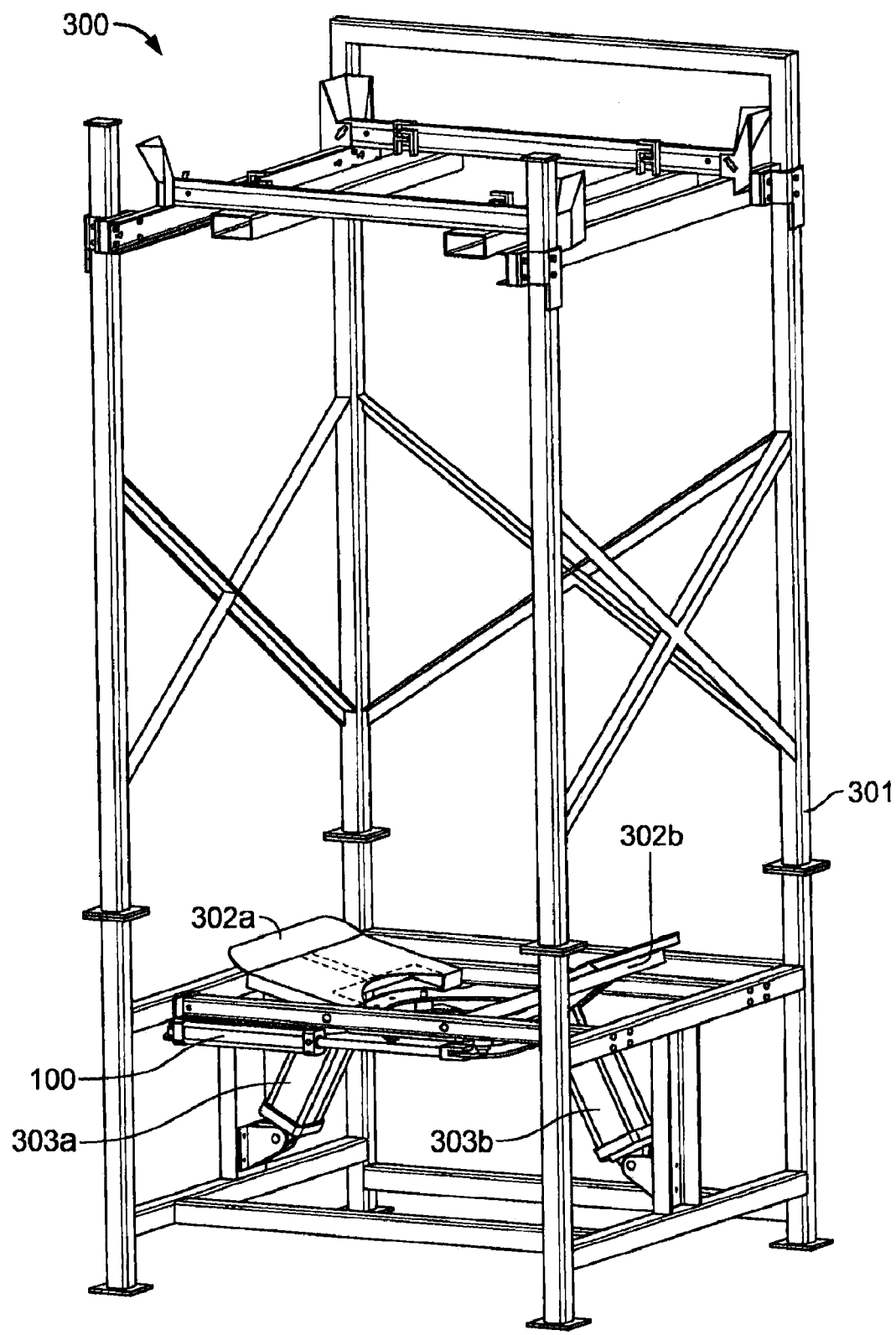
FIG. 3 is a view of a cinch valve mounted as part of a bulk bag unloader assembly.

In some implementations, the bulk bag is mounted just above the cinch valve assembly either onto a vibrating bulk bag unloader or mechanical paddle type unloader (see, e.g., FIG. 3). The spout of the bulk bag is then drawn down through the cinch valve aperture and attached to the process equipment located below. The bulk bag spout tie is then opened and material begins to flow. The vibrating or mechanical paddle type bulk bag unloader is activated to maintain product flow. In some implementations, it is advantageous to make the entire assembly dust-tight.

If, during the product discharge process, a user requires a material change, the pneumatic cylinder of the cinch valve is actuated. This action causes the orbital plate to rotate in the direction of the pneumatic air cylinder, rotating about the center axis through a cinch valve aperture. Since one end of each cable is affixed onto this orbital plate, the cables rotate toward the center of the cinch valve assembly. This movement causes all four cables to converge toward the center point of the valve when the air cylinder is fully contracted. In some implementations, the cables are arranged such that they overlap each other to form a secure closure upon convergence (see, e.g., FIGS. 1B and 1C). This action constricts the bulk bag discharge spout and effectively cinches the discharge spout along a short length of the bag (e.g., the height of the woven closure, which in some implementations is about twice the thickness of a cable) and thereby allows for easy tie-off of the bag spout. Once the bulk bag has been properly tied off, it can be removed and stored, and another bulk bag, e.g., containing a different material, can be loaded in its place.

II. Implementations of a Cinch Valve

Figure 1A:
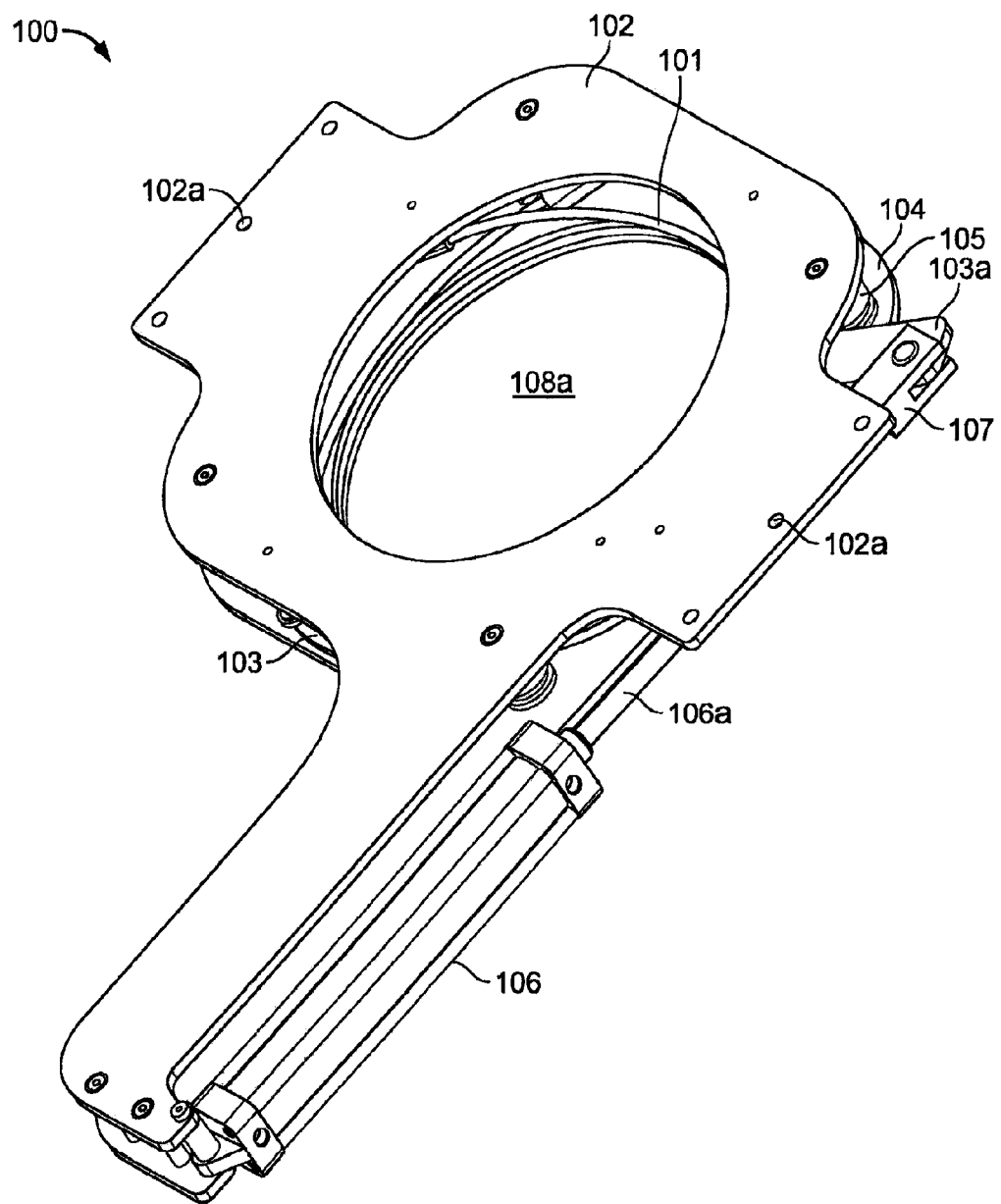
FIG. 1A is a perspective view of an implementation of a cinch valve in the open position.

FIG. 1A illustrates a perspective view of an implementation of a cinch valve 100. The spout of a bulk bag would be placed through the valve opening 108a. The cinch valve 100 includes an upper fixed mounting plate 102, a rotating orbital plate 103 (see also FIG. 2A) and a lower fixed plate 104. The plates 102-104 each have apertures that together define opening 108a. The upper fixed mounting plate 102 includes mounting features 102a that allow securing the cinch valve 100 to, e.g., a bulk bag unloading assembly (see FIG. 3). The rotating orbital plate 103 is kept aligned between the upper and lower plates 102 and 104, respectively, by one or more grooved bearing (bushing) idlers 105. The bearing idlers 105 allow the orbital plate 103 to rotate, but substantially constrain it from translating in other directions.

A linear actuator 106 causes rod 106a to translate. The linear actuator 106 can be powered, e.g., by an electric motor, hydraulics, or pneumatics. In some implementations, the plate 103 comprises gear teeth that mate with gear teeth coupled to a rotational actuator to thereby rotate the plate 103. The rod 106a is coupled to the rotating orbital plate 103 at a mount 103a by way of a clevis and pin assembly 107. As the rod 106a translates, the rotating orbital plate 103 rotates. In this implementation, as the rod 106a retracts into actuator 106, it causes the orbital plate 103 to rotate in a clockwise direction and as the rod 106a extends, it causes the orbital plate 103 to rotate in a counter-clockwise direction. Rotation of the orbital plate 103 in a clockwise direction causes the cables of cable assembly 101 to converge, thereby sealing the bulk bag and rotation of the orbital plate in a counter-clockwise direction causes the cables of the cable assembly 101 to separate, thereby allowing material to flow out of the bulk bag.

In some implementations, the upper fixed mounting plate 102, rotating orbital plate 103 and lower fixed plate are made of carbon steel, but other materials can be used (e.g., aluminum, stainless steel, titanium, etc.). In some implementations, the materials are chosen to be non-reactive with the material being handled. In some implementations, the material is coated to provide insulation from the material being handled or from the environment to which it is exposed. In some implementations, the cables of the cable assembly 101 comprise carbon steel, stainless steel or galvanized wire that can be coated with urethane, polyester, vinyl, polyethylene, PVC, nylon, PTFE, fluoropolymer, etc.

Figure 1B:
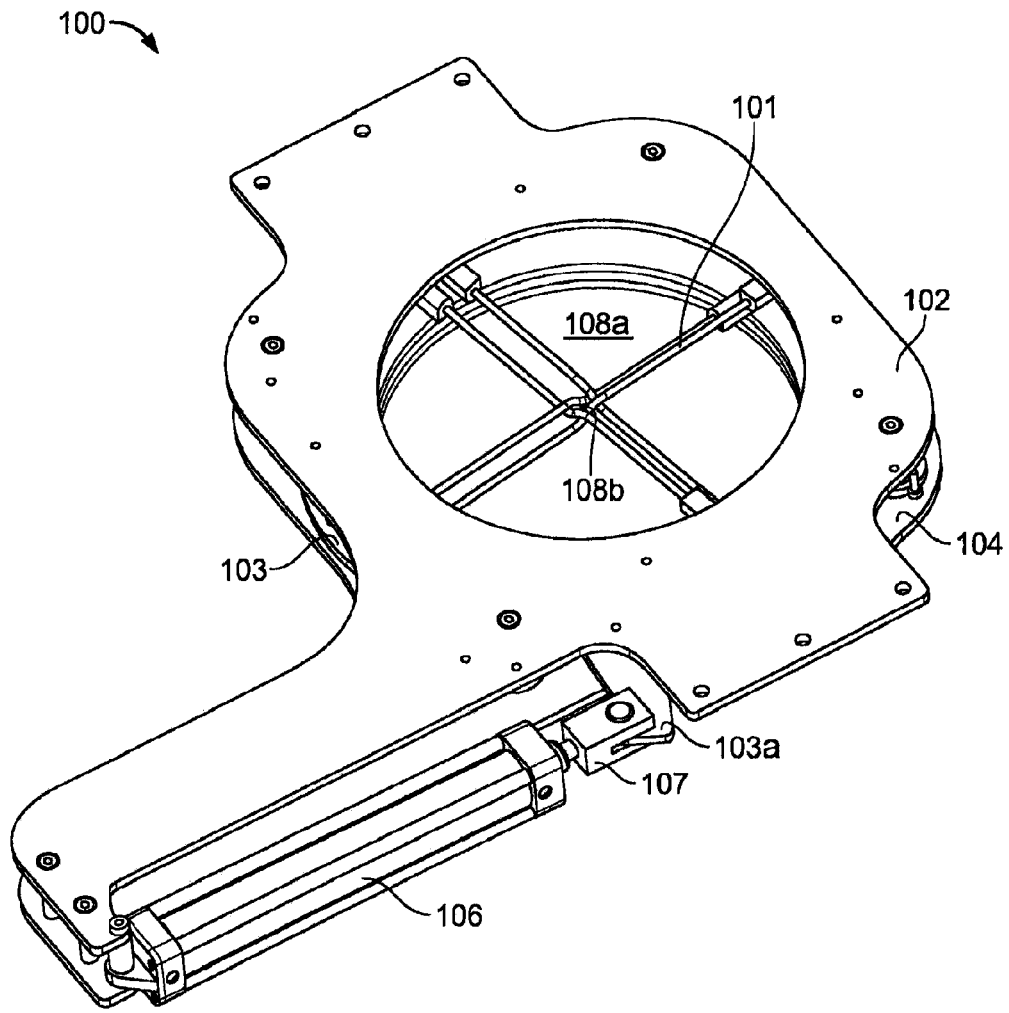
FIG. 1B is a perspective view of an implementation of a cinch valve in the closed position.

FIG. 1B illustrates the cinch valve 100 in the closed position. The linear actuator caused the rod 106a to retract, thereby rotating the orbital plate 103 in a clockwise manner. The opening 108a (see FIG. 1A) has been sealed by cable assembly 101 to form the closure 108b (see FIGS. 1B, 1C). As shown, the cables of the cable assembly 101 weave with one another to create a tight seal, thereby facilitating closure and allowing for the tie off of a bulk bag. The weaving is achieved by using cables comprising flexible portions. The closure 108b is located approximately in the center of the aperture defined by the orbital plate 103. In this implementation, the apertures defined by the plates 102, 103 and 104 are coaxial and substantially circular and, therefore, share substantially the same center. That arrangement is not required in all implementations. Some implementations can include one or more apertures that are not circular and/or not coaxial.

Figure 1C:
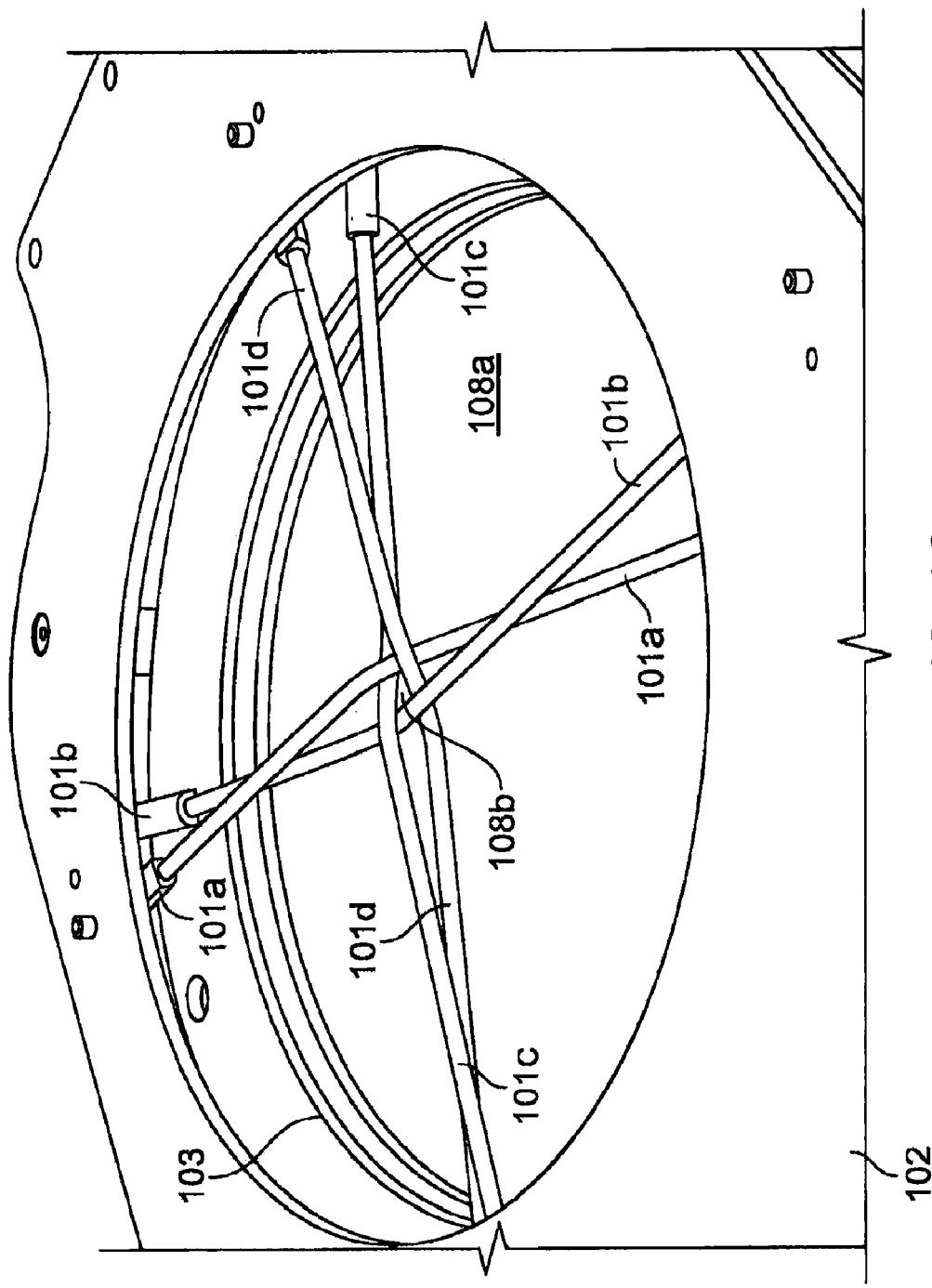
FIG. 1C is a view of the closure.

FIG. 1C illustrates in more detail how the cables of the cable assembly 101 weave with one another and form closure 108b. The cable assembly includes four cables 101a, 101b, 101c and 101d. Starting with the uppermost quadrant of the opening 108a, one end of cable 101a is mounted to the upper fixed mounting plate 102 and one end of cable 101b is mounted to the orbital plate 103. As shown in the lowermost quadrant of the opening 108a, the other end of cable 101a is mounted to the orbital plate 103 and the other end of cable 101b is mounted to the upper fixed mounting plate 102. At the leftmost quadrant of the opening 108a, cable 101c is mounted to the upper fixed mounting plate 102 and one end of cable 101d is mounted to rotating orbital plate 103. At the rightmost quadrant of the opening 108a, the other end of cable 101c is mounted to the rotating orbital plate 103 and the other end of cable 101d is mounted to the upper fixed mounting plate 102. As a result, when forming the closure 108b, (1) cable 101a overlaps cable 101c and passes under cable 101d, (2) cable 101b passes under cable 101c and overlaps cable 101d; (3) cable 101c overlaps cable 101b and passes under cable 101a; and (4) cable 101d passes under cable 101b and overlaps cable 101a. The resulting woven closure 108b securely closes a bulk bag in a manner that allows easy tie off. One particular advantage is that by converging the closure 108b into a weave, the bulk bag is tightly sealed (e.g., a 5.08 cm (2 in) to 1.905 cm (¾ in) diameter cinch or less, depending on the thickness of the bag material) substantially within the distance between the upper fixed mounting plate 102 and the orbital plate 103, or less. In some implementations, the bag is sealed within the distance substantially equally to the thickness of two cables (e.g., 101a, 101b, 101c or 101d). In some implementations each cable is about 0.635 cm (0.25 in) thick, thereby creating a cinch that is about 1.27 cm (0.5 in) along the length of the bag. Actual closure heights can range, e.g., between 0.635 cm (0.25 in) to 2.54 cm (1 in), depending on the size of the mechanism. This facilitates tying off a bag and creating a tight seal, as compared to designs in which, for example, the sealing members do not form a weave with each other.

Figure 1D:
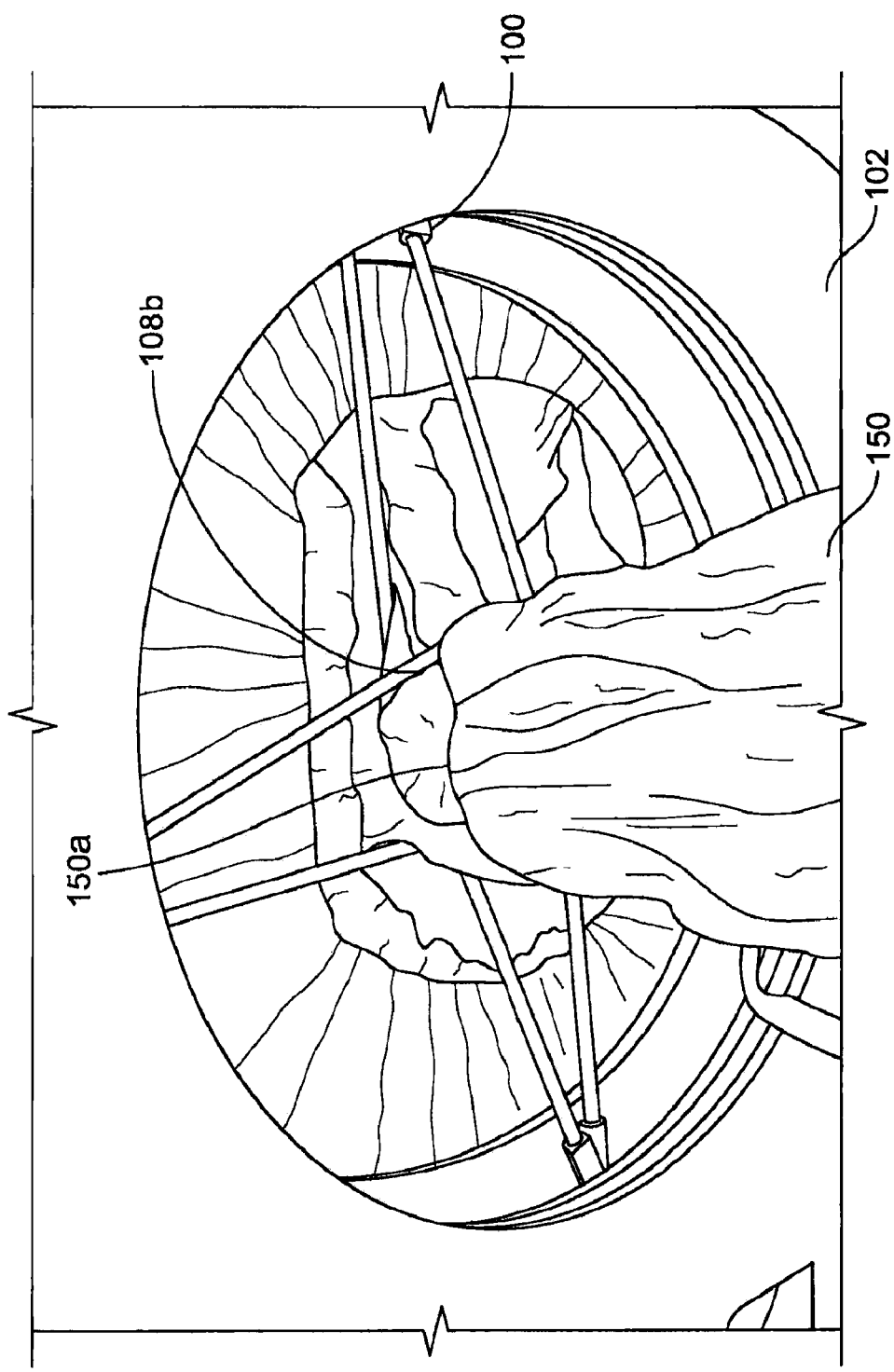
FIG. 1D illustrates a bag sealed by the closure.

FIG. 1D illustrates a bag 150 sealed by the closure 108b. The woven closure 108b gathers the bag 150 into a cinch 150a that facilitates tying off the bag 150. The cinch 150a is in substantially the same plane as the closure 108b. The length of the cinch 150a is about equal to the thickness of two cables, but can be somewhat greater depending on the thickness and/or stiffness of the bag material.

Figure 2A:
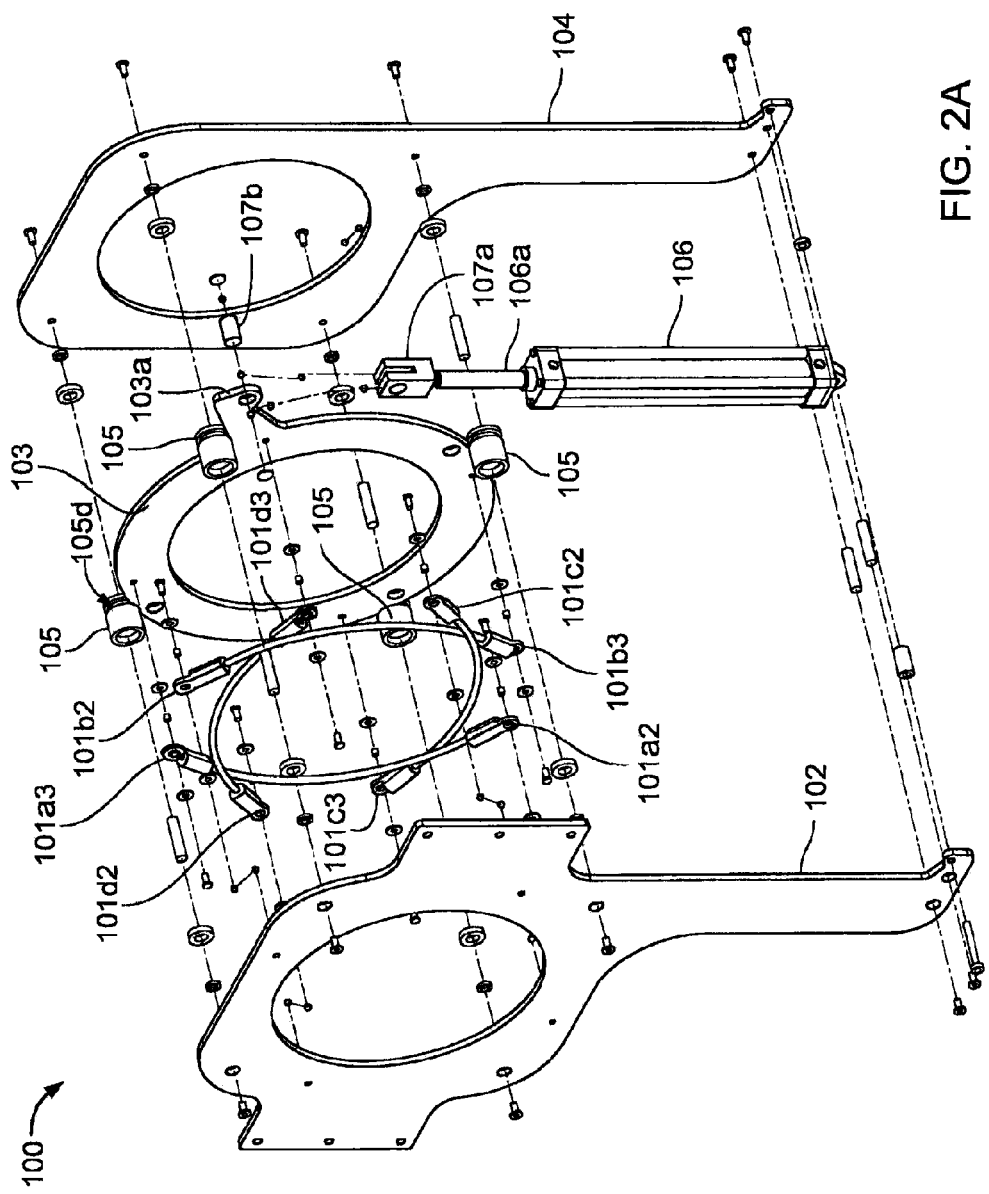
FIG. 2A is an exploded view of an implementation of a cinch valve.

FIG. 2A is an exploded view of an implementation of a cinch valve 100. At opposing ends are the upper fixed mounting plate 102 and the lower fixed plate 104.

One end of cable 101a is mounted to the upper fixed mounting plate 102 (101a2) and the other end is mounted to the orbital plate 103 (101a3). One end of cable 101b is mounted to the upper fixed mounting plate 102 (101b2) and the other end is mounted to the orbital plate 103 (101b3). One end of cable 101c is mounted to the upper fixed mounting plate 102 (101c2) and the other end is mounted to the orbital plate 103 (101c3). One end of cable 101a is mounted to the upper fixed mounting plate 102 (101d2) and the other end is mounted to the orbital plate 103 (101d3). This overlapping arrangement allows the cables, when converged, to form a weave that tightly seals the outlet spout of a bulk bag.

The linear actuator 106 is mounted between the upper fixed mounting plate 102 and the lower fixed plate 104. At the end of the rod 106a is a clevis 107a. The clevis 107a couples to an actuator mount 103a of the orbital plate 103 by a pin 107b. The pin 107b is rotatable relative to the clevis 107a.

The upper and lower plates (102 and 104, respectively) are separated by, among other things, a plurality of grooved bearing (bushing) idlers 105. Each idler 105 comprises a groove 105d that engages an edge of the orbital plate 103. The idlers 105 allow the orbital plate 103 to rotate as the actuator 106 moves rod 106a, but the grooves 105d substantially prevent linear translation between the upper and lower plates (102 and 104, respectively).

Figure 2B:
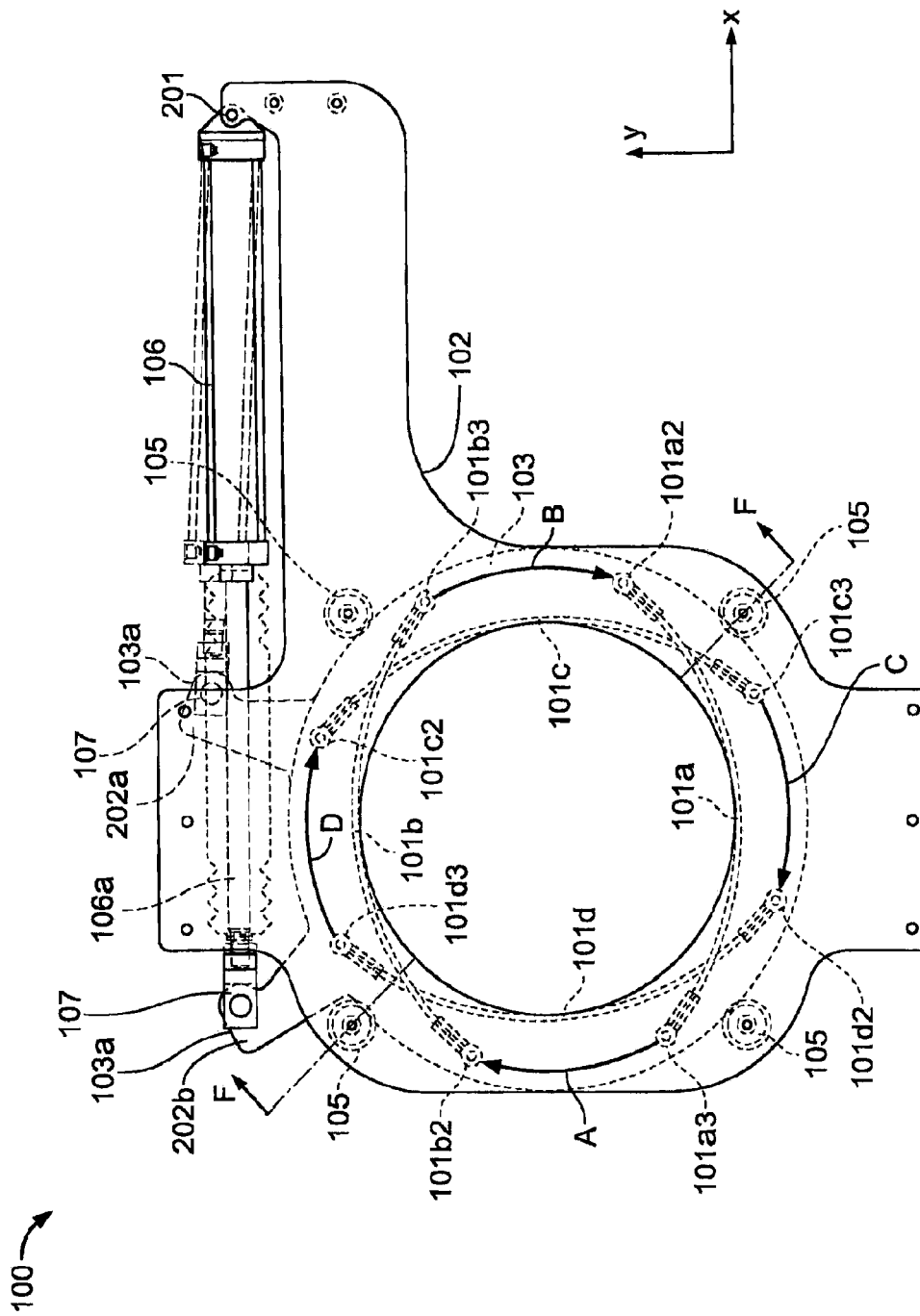
FIG. 2B is a view of an implementation of a cinch valve with the upper fixed mounting plate illustrated as substantially transparent.

FIG. 2B is a view of an implementation of a cinch valve 100 with the upper fixed mounting plate 102 illustrated as substantially transparent. The actuator 106 is shown moving the orbital plate 103 to two positions, open (202b) and closed (202a). As shown, the location in the y-direction of the orbital plate actuator mount 103a varies depending upon its position.

Accordingly, the actuator 106 is mounted on a pivot 201 that allows the actuator to adjust its angle to accommodate the position of the actuator mount 103a as it moves.

This view, which illustrates plate 102 as transparent, reveals how the edge of the orbital plate 103 couples with the groove of the idlers 105, thereby enabling rotation. This view also reveals the movement of the individual cables 101a-d. As the actuator 106 causes the orbital plate 103 to move from position 202b to 202a, the cables 101a-d move as follows:

(i) end 101a3 of cable 101a, which is attached to orbital plate 103, moves along the path of arrow "A", whereas end 101a2 remains in place because it is attached to upper fixed mounting plate 102;

(ii) end 101b3 of cable 101b, which is attached to orbital plate 103, moves along the path of arrow "B", whereas end 101b2 remains in place because it is attached to upper fixed mounting plate 102;

(iii) end 101c3 of cable 101c, which is attached to orbital plate 103, moves along the path of arrow "C", whereas end 101c2 remains in place because it is attached to upper fixed mounting plate 102; and (iv) end 101d3 of cable 101d, which is attached to orbital plate 103, moves along the path of arrow "D", whereas end 101d2 remains in place because it is attached to upper fixed mounting plate 102.

Figure 2C:
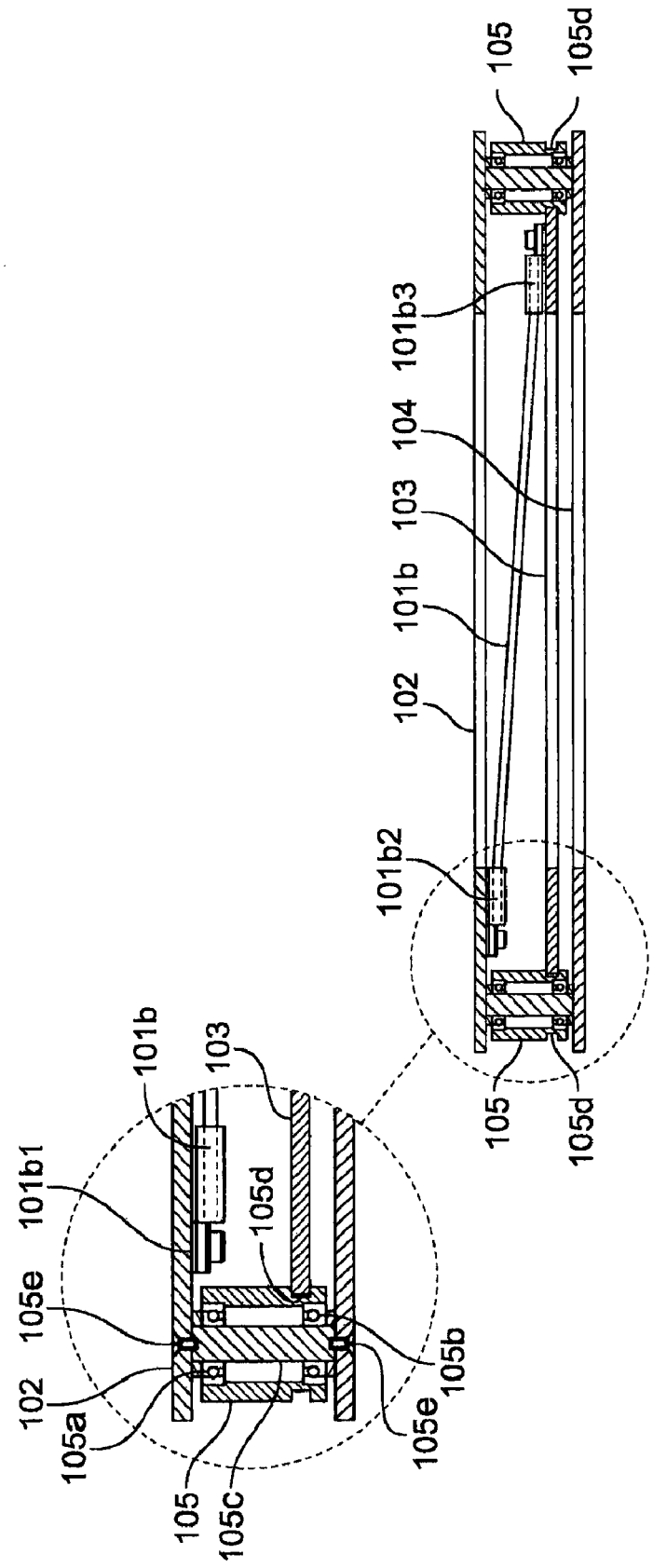
FIG. 2C is a cross-sectional view of an implementation of a cinch valve.

FIG. 2C illustrates two views taken through the line F-F of FIG. 2B. This view illustrates one cable 101b mounted on one end (101b2) to the upper fixed mounting plate 102 and mounted on the other end (101b3) to the orbital plate 103. The cable 101 is mounted to the plates by a mounting post 101b1, which in some implementations is a metal collar with a hole that a screw or other fastener passes through. In some implementations, the woven closure 108b is formed in the space between plates 101 and 103.

This view also illustrates the edge of the orbital plate 103 mating with the groove 105d of the idler 105. The idler 105, in this implementation, includes an upper bearing assembly 105a, lower bearing assembly 105b and central post 105c. In some implementations, the upper and lower bearing assemblies are replaced with bronze bushings (or other bushing materials). The central post 105c is attached to the upper fixed mounting plate 102 and lower fixed plate 104 by fasteners 105e (e.g., screws).

FIG. 3 illustrates a cinch valve 100 implemented in a bulk bag unloader assembly 300. The bulk bag unloader assembly includes a frame 301 that supports the bulk bag in a manner such that the spout of the bag passes through the opening 108a of the cinch valve 100 (i.e., the cinch valve 100 is disposed proximate to the spout end of the frame 301). To facilitate unloading of the bulk bag contents, mechanical paddle-type unloaders 302a and 302b (each powered by respective pneumatic cylinders 303a and 303b) agitate the bulk bag.

III. Alternative Implementations of a Cinch Valve

Figure 4:
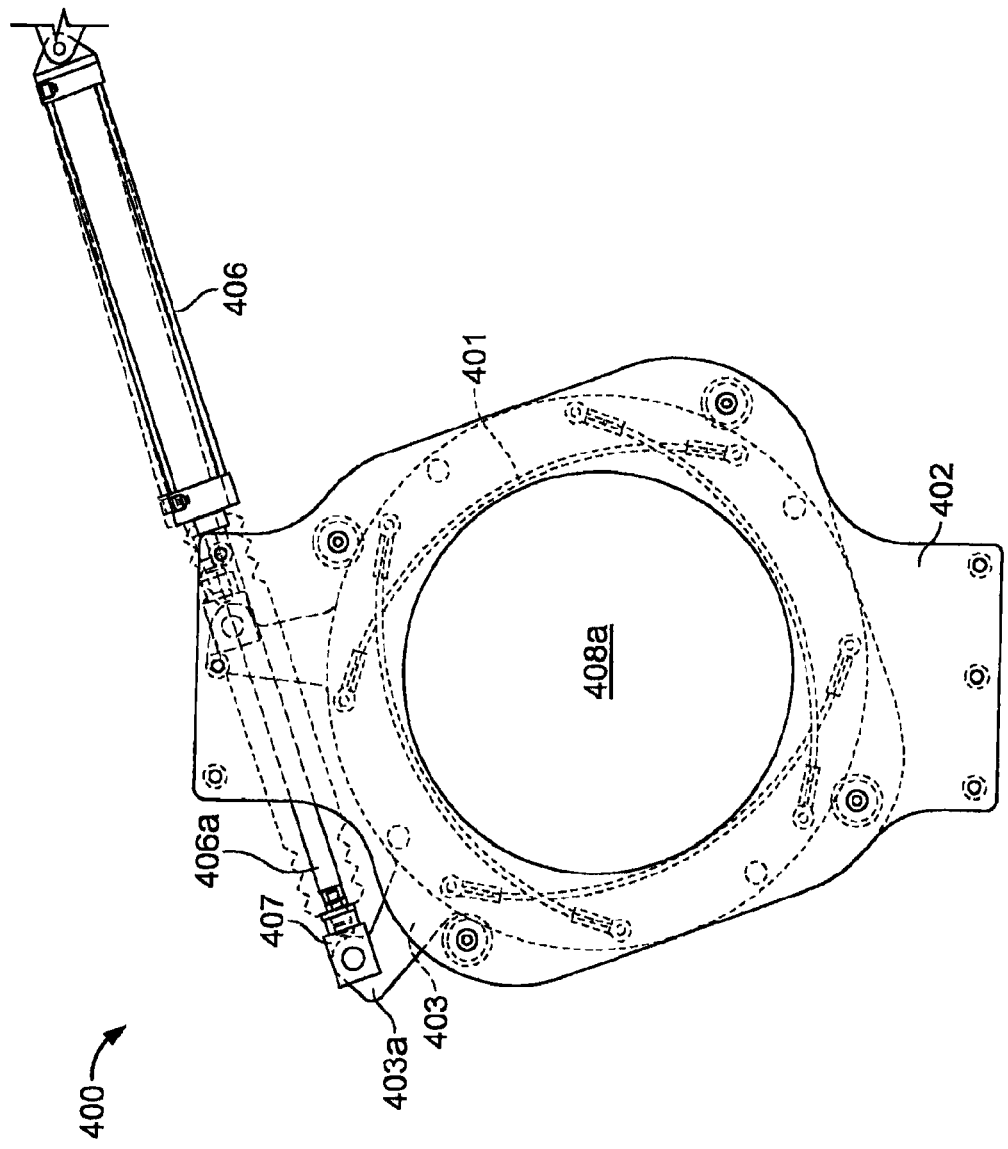
FIG. 4 is a view of an alternate implementation of a cinch valve.

FIG. 4 illustrates an alternative implementation of a cinch valve 400. Like the implementation of, e.g., FIG. 1A, the cinch valve 400 includes a linear actuator 406 having a rod 406a coupled to an actuator mount 403a of an orbital plate 403. An upper fixed mounting plate 402, the orbital plate 403 and lower fixed plate (not visible) define an opening 408a. The opening 408a can be constrained by a woven closure formed by cable assembly 401. A main difference between this implementation and that of, e.g., FIG. 1A, is that the opening 408a seals (i.e., the cable assembly 401 forms a woven closure) when the rod 406a extends, as opposed to when it retracts. The arrangement of, e.g., FIG. 1A can be desirable when hydraulic or air cylinders are used because, e.g., they are often more tolerant of stress or offer greater force when contracting rather than when extending. This arrangement (400) can be desirable when an actuator 406 is used that, e.g., better tolerates stress or offers greater force when it is extending.

IV. Advantages of Flexible Cable

Some implementations utilize cables having flexible portions (see, e.g., cables 101). For example, in some implementations, substantially the entire cable is flexible. Cables having flexible portions can offer advantages over designs that use inflexible converging members (e.g., rigid bars). For example, cables (e.g., 101) can offer a tighter seal than inflexible bars due to, e.g., the ability to form a woven closure. This advantage is pronounced when the bulk bag being sealed carries a fine material (e.g., small particulates). Moreover, since the woven closure can provide a cinch that is as short as the thickness of two cables, tying off a bag is made easier. Also, since bulk bags are often re-used, cables (e.g., 101) can be gentler on bags than other closures, reducing the likelihood of damage as a result of sealing.

Other advantages relate to the mechanical simplicity afforded by using cables (e.g., 101) as opposed to inflexible members. For example, some of the implementations described herein utilize a single linear actuator and have relatively few joints as compared to designs that use inflexible members.

A number of implementations have been described. Nevertheless, it will be understood that various modifications may be made without departing from the spirit and scope of the invention. Accordingly, other implementations are within the scope of the claims.

What is claimed is:

1. A cinch valve comprising:
an upper plate comprising a first aperture;
an orbital plate rotatable relative to an upper plate and comprising a second aperture substantially aligned with the first aperture;
an actuator coupled to the orbital plate arranged to rotate the orbital plate between a first position and a second position; and
a plurality of cables each comprising a flexible portion, each cable having a first end and a second end, wherein each first end is coupled to an upper plate and each second end is coupled to the orbital plate;
wherein rotation of the orbital plate from the first position to the second position will cause the plurality of cables to converge and form a woven closure in approximately the center of the second aperture, and
wherein the plurality of cables are configured such that, when the cables converge and form the woven closure, each one of the cables: passes over a first other cable and a second other cable, passes under a third other cable, and passes under the first other cable.

2. The cinch valve of claim 1 comprising a lower plate having a third aperture substantially aligned with the first and second apertures, wherein the orbital plate is disposed between the upper and lower plates.

3. The cinch valve of claim 2 comprising a plurality of grooved bearing assemblies coupled to the upper and lower plates, each grooved bearing assembly comprising a groove arranged to receive an edge of the orbital plate.

4. The cinch valve of claim 1 wherein the actuator is a linear actuator comprising a rod coupled to the orbital plate, and retraction of the rod causes rotation of the orbital plate from the first position to the second position.

5. The cinch valve of claim 1 wherein the actuator is a linear actuator comprising a rod coupled to the orbital plate, and extension of the rod causes rotation of the orbital plate from the first position to the second position.

6. The cinch valve of claim 1 wherein substantially the entirety of each cable is flexible.

7. The cinch valve of claim 1 wherein the plurality of cables are configured such that, when the orbital plate is in the first position, each cable is entirely positioned between first plate and the orbital plate.

8. A bulk bag unloading apparatus comprising:
a frame arranged to support a bulk bag;
a cinch valve coupled to the frame and disposed proximate to a spout end of the frame, the cinch valve comprising:
an upper plate comprising a first aperture;
an orbital plate, rotatable relative to an upper plate, and comprising a second aperture substantially aligned with the first aperture;
an actuator coupled to the orbital plate arranged to rotate the orbital plate between a first position and a second position; and
a plurality of cables each comprising a flexible portion, each having a first end and a second end, wherein each first end is coupled to an upper plate and each second end is coupled to the orbital plate;
wherein rotation of the orbital plate from the first position to the second position causes the plurality of cables to converge and form a woven closure in approximately the center of the second aperture, and
wherein the plurality of cables are configured such that, when the cables converge and form the woven closure, each one of the cables: passes over a first other cable and a second other cable, passes under a third other cable, and passes under the first other cable.

9. The apparatus of claim 8 comprising a paddle-type unloader coupled to the frame and disposed proximate to the spout end of the frame.

10. The apparatus of claim 8 wherein the cinch valve comprises a lower plate having a third aperture substantially aligned with the first and third apertures, wherein the orbital plate is disposed between the upper and lower plates.

11. The apparatus of claim 10 wherein the cinch valve comprises a plurality of grooved bearings coupled to the upper and lower plates, each grooved bearing comprising a groove arranged to receive an edge of the orbital plate.

12. The apparatus of claim 8 wherein the actuator is a linear actuator comprising a rod coupled to the orbital plate, and retraction of the rod causes rotation of the orbital plate from the first position to the second position.

13. The apparatus of claim 8 wherein the actuator is a linear actuator comprising a rod coupled to the orbital plate, and extension of the rod causes rotation of the orbital plate from the first position to the second position.

14. The apparatus of claim 8 wherein substantially the entirety of each cable is flexible.

15. The cinch valve of claim 8 wherein the plurality of cables are configured such that, when the orbital plate is in the first position, each cable is entirely positioned between the upper plate and the orbital plate.

16. A cinch valve comprising:
a plate comprising a first aperture;
a plurality of cables, each cable comprising a flexible portion, wherein one end of each cable is mounted to the plate; and
means for causing the plurality of cables to converge and form a woven closure in approximately the center of the first aperture,
wherein the plurality of cables are configured such that, when the cables converge and form the woven closure, each one of the cables: passes over a first other cable and a second other cable, passes under a third other cable, and passes under the first other cable.

17. The cinch valve of claim 16 wherein substantially the entirety of each cable is flexible.

18. The cinch valve of claim 16 wherein the plurality of cables are configured such that, when the means for causing comprises an orbital plate, and when the orbital plate is in a first position, each cable is entirely positioned between the plate and the orbital plate.

* * * * *

UNITED STATES PATENT AND TRADEMARK OFFICE
CERTIFICATE OF CORRECTION

PATENT NO. : 8,282,069 B2  
APPLICATION NO. : 12/277629  
DATED : October 9, 2012  
INVENTOR(S) : Marc S. Landry Page 1 of 1

It is certified that error appears in the above-identified patent and that said Letters Patent is hereby corrected as shown below:

Column 6, line 35 (Claim 1, line 3) delete "an upper plate" and insert --the upper plate--.

Column 6, line 43 (Claim 1, line 11) delete "an" and insert --the--.

Column 7, line 7 (Claim 7, line 3) delete "first" and insert --the upper--.

Column 7, line 14 (Claim 8, line 6) delete "an upper plate" and insert --the upper plate--.

Column 7, line 23 (Claim 8, line 14) delete "an" and insert --the--.

Signed and Sealed this  
Fifteenth Day of January, 2013

David J. Kappos  
*Director of the United States Patent and Trademark Office*